March 18, 1958  A. R. GRAD  2,826,964
INTERNAL BROACHING MACHINE
Filed Dec. 23, 1953  7 Sheets-Sheet 2

INVENTOR
ADOLF R. GRAD
BY
Wesley R. Merrill
ATTORNEY

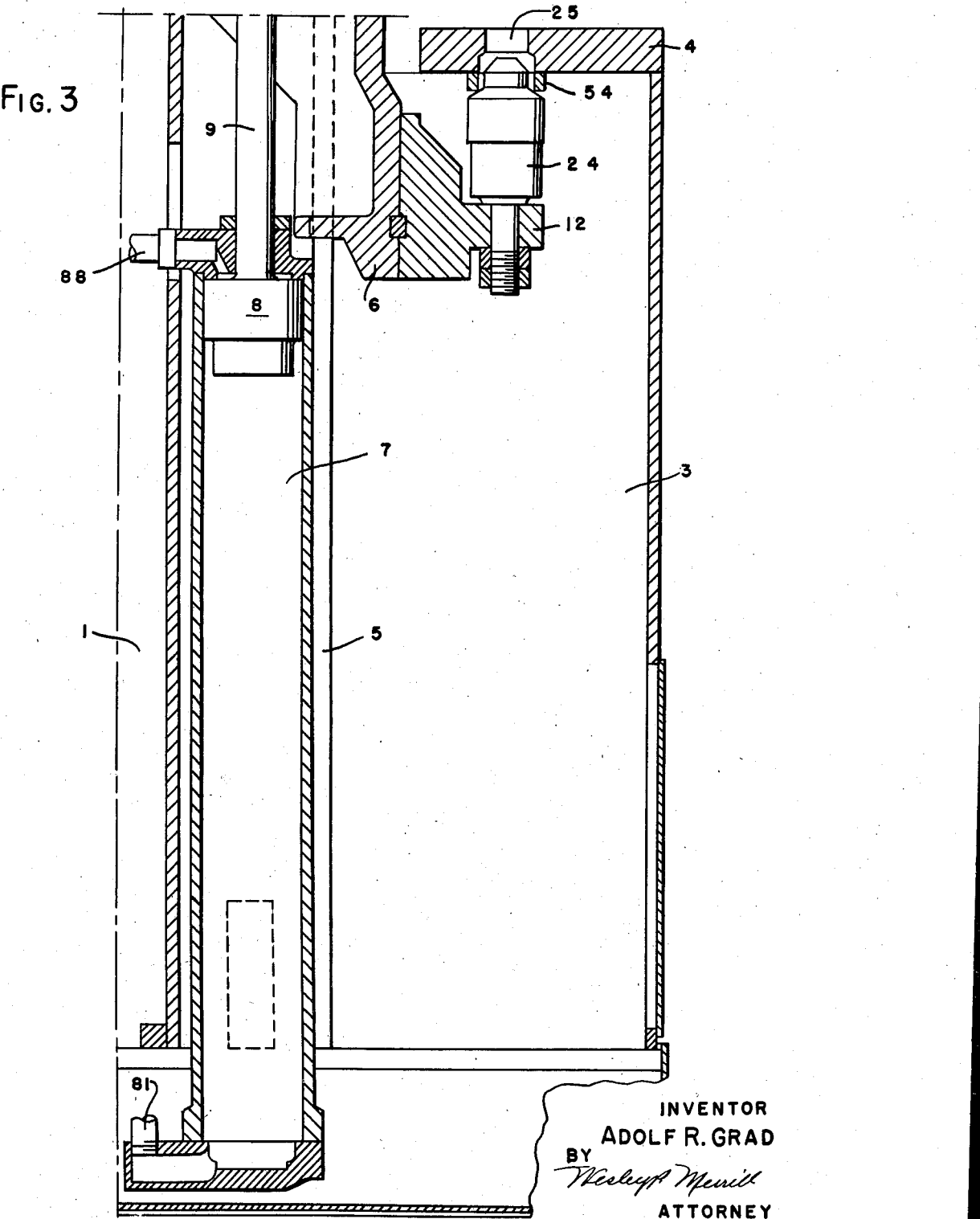

March 18, 1958 A. R. GRAD 2,826,964
INTERNAL BROACHING MACHINE
Filed Dec. 23, 1953 7 Sheets-Sheet 4

INVENTOR
ADOLF R. GRAD
BY
Wesley P. Merrill
ATTORNEY

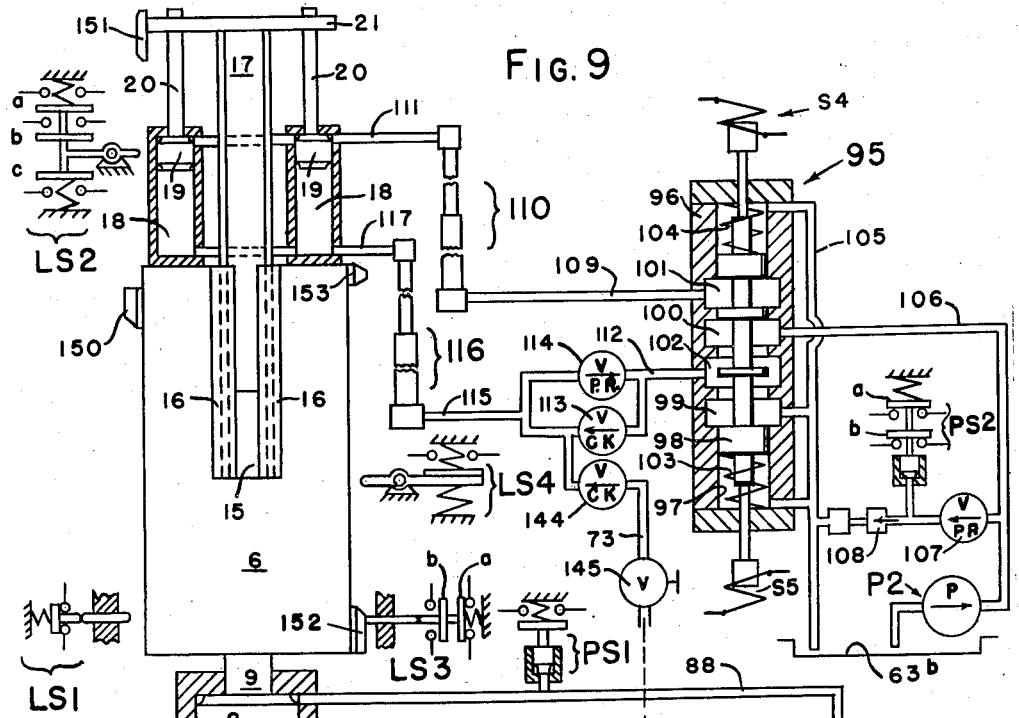

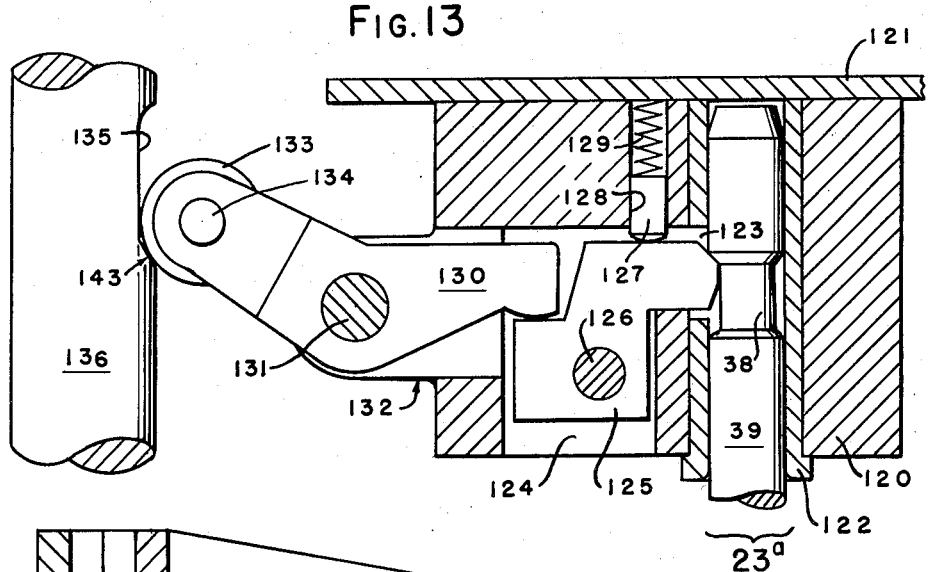

United States Patent Office 2,826,964
Patented Mar. 18, 1958

2,826,964

INTERNAL BROACHING MACHINE

Adolf R. Grad, Milwaukee, Wis., assignor, by mesne assignments, to Detroit Broach & Machine Company, Rochester, Mich., a corporation of Michigan Application December 23, 1953, Serial No. 400,051

2 Claims. (Cl. 90—33)

This invention relates to broaching machines of the type having a stationary work support for supporting work to be broached, a broaching slide reciprocable in a path adjacent to the work support and having a tool puller for engaging the leading end or nose of a broach, a tool handling slide reciprocable in a path parallel to the path of the broaching slide and having a socket to engage the trailing end or tail of the broach, power means for reciprocating the tool handling slide to move the nose of the broach into and out of engagement with the tool puller, and power means for reciprocating the broaching slide to pull the broach through the work and thereafter return the broach into engagement with the socket.

In the prior machines of that type, the power means for the tool handling slide is arranged in a stationary position and the broach is pulled out of the socket immediately after the broaching slide starts to move on a broaching stroke.

The present invention has as an object to provide a broaching machine of the above type in which the trailing end of the broach is guided during a large part of the broaching stroke.

Another object is to provide a machine in which tension may be maintained upon the broaching tool during the greater part of the broaching operation.

Another object is to provide such a machine which is very accurate in operation.

A machine constructed according to the present invention has the advantage that it may be reduced in length when being transported and erected.

Other objects and advantages will appear from the description hereinafter given of a machine embodying the invention.

According to the invention in its principal aspect, the machine is provided with a broaching slide having a guideway, the tool handling slide is reciprocable in the guideway, and the power means for reciprocating the tool handling slide is carried by the broaching slide.

The invention is exemplified by the broaching machine shown diagrammatically in the accompanying drawings in which the views are as follows:

Fig. 3 is a central vertical section taken through the lower part of the machine on the line 3—3 of Fig. 2.

Fig. 4 is a section taken through the upper part of the machine on the line 4—4 of Fig. 2.

Fig. 9 is a diagram illustrating the hydraulic circuit of the machine and indicating the relative locations and functions of certain electrical devices.

Fig. 10 is a view showing a differential valve member in a position different from that shown in Fig. 9.

Fig. 13 is a central vertical section taken through a tool handling socket which may be used when it is desired to maintain tension upon the broaching tool during the broaching operation.

Fig. 14 is a sectional view taken through a part of the machine in the same plane as Fig. 4 and illustrating a means for opening the socket shown in Fig. 13.

Figure 1:
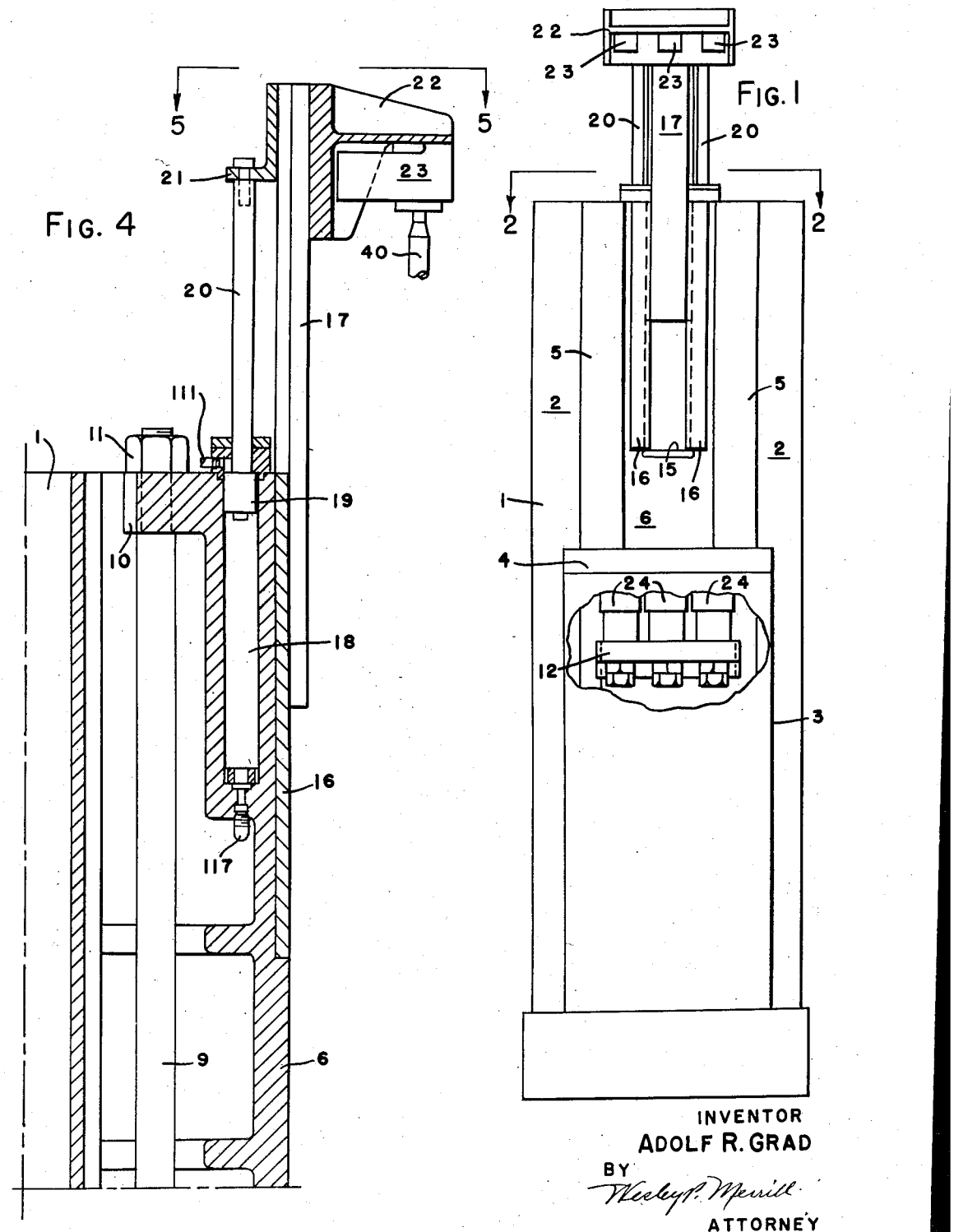
Fig. 1 is a front elevation of the machine.
Figure 2:
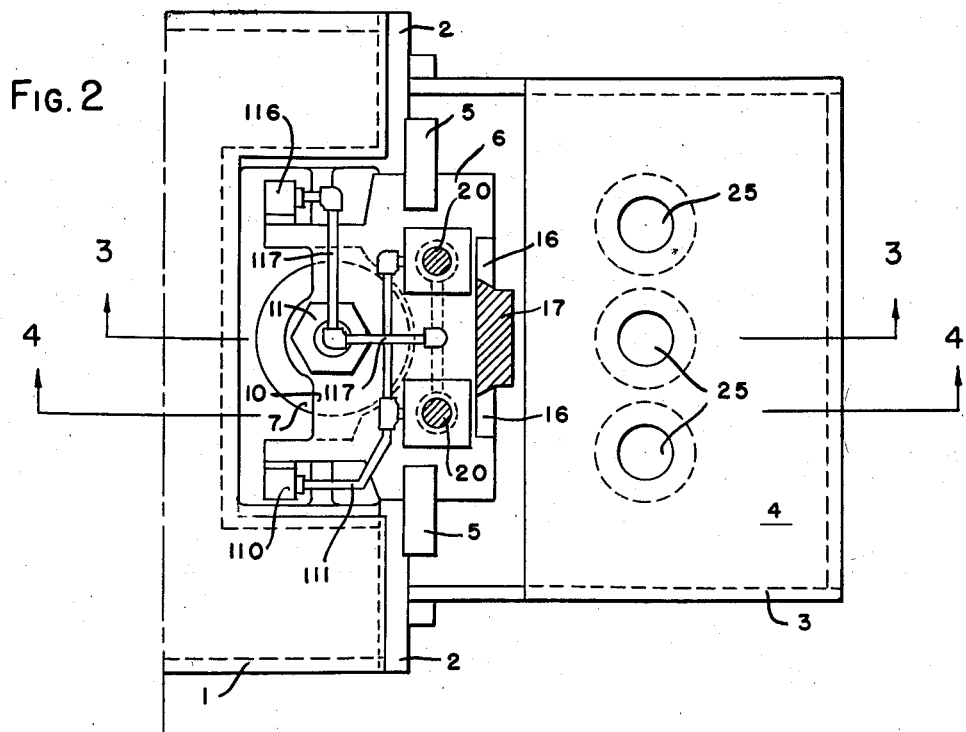
Fig. 2 is a plan view partly in section taken on the line 2—2 of Fig. 1 but drawn to a larger scale, the rear portion of the machine being omitted.

For the purpose of illustration, the machine has been shown as having a frame which includes a vertical column or main frame 1 having a pair of spaced apart front plates 2 and a sub-frame or knee 3 which is fixed at its opposite sides to plates 2 and has a heavy plate or work support 4 upon its upper end.

Each of front plates 2 has a guide bar 5 fixed thereto and extending beyond the inner edge thereof. Plates 2 and 5 form a guideway for a main or a broaching slide 6 which is adapted to be reciprocated vertically by a hydraulic motor shown as including a cylinder 7 which is rigidly secured to frame 1 in a vertical position, a piston 8 which is fitted in cylinder 7, and a piston rod 9 which is fixed to piston 8 and is rigidly connected to slide 6. As shown, rod 9 is extended through a flange 10 which is formed integral with slide 6 at the upper end thereof, the portion of rod 9 which extends through flange 10 is reduced in diameter, and a nut 11 is threaded upon the upper end of rod 9. The lower portion of slide 6, which remains within knee 3 during reciprocation of slide 6, has rigidly secured thereto a bracket 12 to which one or more tool pullers may be attached as will presently be explained.

Main slide 6 has an elongated recess 15 extending into it from its front face and a pair of guide bars or gibs 16 arranged at opposite sides of recess 15 to form therewith a guideway for a tool handling or auxiliary slide 17 which can move vertically therein relatively to slide 6 but is prevented from moving in any other direction.

Auxiliary slide 17 is adapted to be reciprocated relatively to slide 6 by power means carried by slide 6 such as one or more hydraulic motors, two being shown. Each hydraulic motor has been shown as including a cylinder 18 which is formed in slide 6, a piston 19 which is fitted in cylinder 18, and a piston rod 20 which has one end fixed to piston 19 and its upper end rigidly secured to slide 17 at the upper end thereof such as being fastened to a bracket 21 which is bolted to the rear face of slide 17 at the upper end thereof.

Slide 17 has a tool handling bracket 22 attached to its front face at or near its upper end in such a manner that it may be adjusted vertically relatively to slide 17 to accommodate broaches of different lengths. For example, bracket 22 may be attached to slide 17 by bolts having the heads thereof arranged in T-slots formed in slide 17.

Bracket 22 has attached thereto one or more tool handling sockets 23, three being shown in Fig. 1, and bracket 12 has an equal number of tool pullers 24 attached thereto. Each socket 23 is in vertical alignment with one of the tool pullers 24 and an opening 25 is formed in work support 4 in vertical alignment with each puller 24 so that broaches can be pulled completely through work arranged upon work support 4 in alignment with openings 25.

Figure 6:
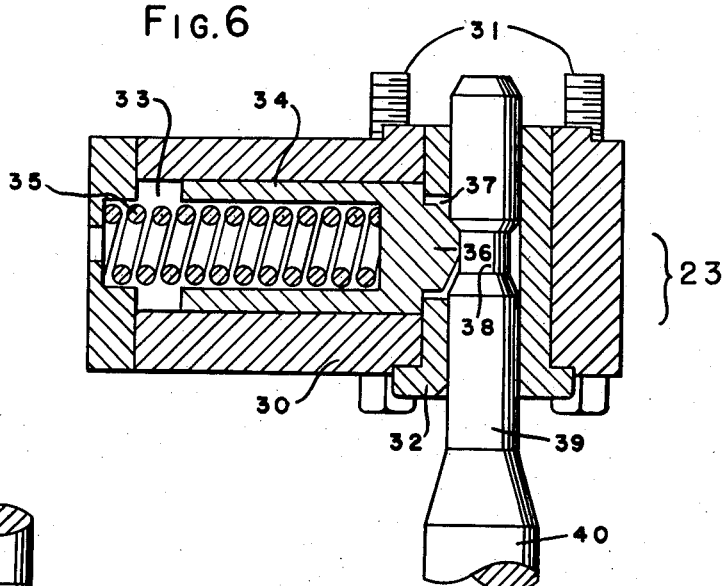
Figs. 6 and 7 are central vertical sections taken, respectively, through a tool handling socket and a tool puller which may be used on the machine
Figure 8:
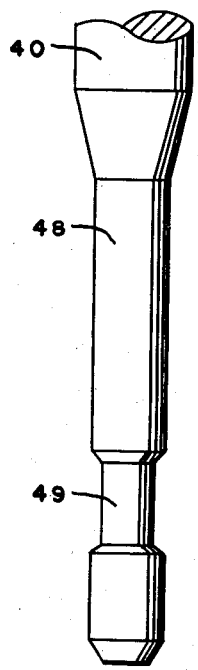
Fig. 8 is a detail view of the leading end or nose of the broach to be used in connection with the tool puller shown in Fig. 7, the views being drawn to a larger scale than the other views.
Figure 7:
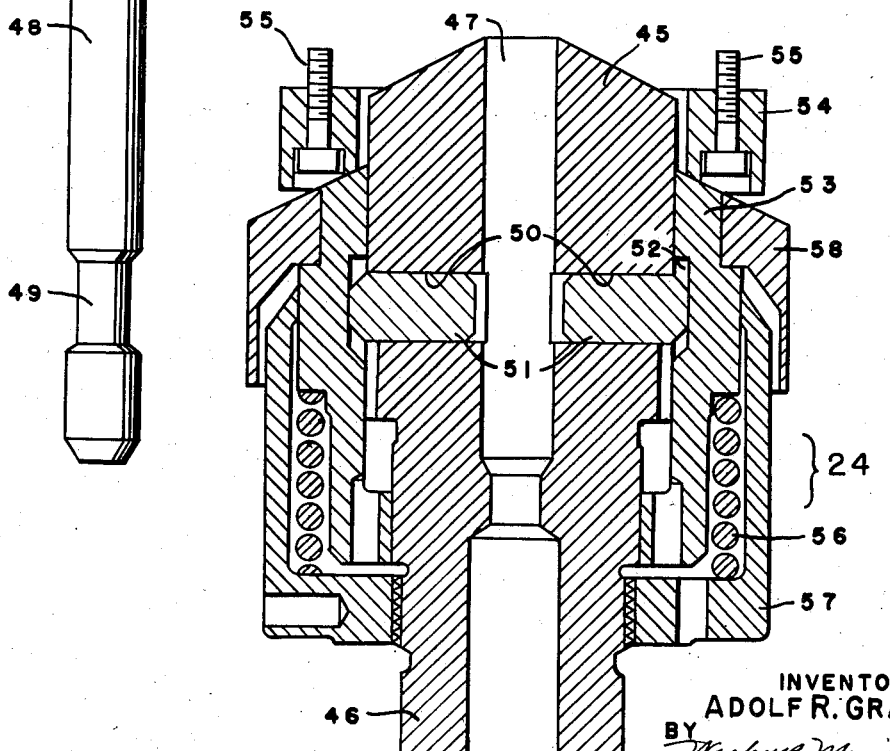

The machine may be provided with any suitable tool handling sockets and tool pullers such as those shown in Figs. 6 and 7 which are of such well known types that only enough thereof has been shown to illustrate the functions thereof.

As shown in Fig. 6, socket 23 includes a casing 30 having a plurality of bolts 31 extending vertically therethrough for attaching it to a part of a machine. Fig. 1 indicates that sockets 23 are bolted directly to bracket 22 but in practice they are bolted to a separate plate (not shown) and the plate is bolted to bracket 22 so that the sockets may be arranged in different positions by using different plates, thereby avoiding the necessity of replacing bracket 22.

Casing 30 has a tubular bushing 32 arranged vertically therein at one end of a horizontal bore 33 which has a plunger 34 fitted therein and urged against bushing 32 by a spring 35. Plunger 34 has a detent 36 formed upon one end thereof and extending through an opening 37 in the wall of bushing 32. Detent 36 is adapted to extend into a cannelure 38 formed in the trailing end or tail 39 of a broach 40.

The end of detent 36, the end of tail 39 and the end walls of cannelure 38 are tapered so that, when socket 23 and broach 40 are moved toward each other, tail 39 can be forced through bushing 32 to the position shown in which position detent 36 will support the weight of broach 40 and, when socket 23 and broach 40 are moved away from each other, broach 40 can be pulled out of bushing 32.

As shown in Fig. 7, each tool puller 24 includes a body 45 having a shank 46 by means of which it may be rigidly secure to bracket 12. Body 45 has an axial bore 47 to receive the nose 48 of broach 40 which has a cannelure 49 formed therein. Bore 47 is intersected by two or more transverse bores 50 each of which has a key 51 slidably fitted therein.

The parts are shown in the positions occupied when main slide 6 is in its uppermost position at which time the outer ends of keys 51 are arranged within an annular cam slot 52 formed in a key actuator 53 which is slidably fitted upon the outer peripheral surface of body 45. With slide 6 in its uppermost position, actuator 53 is held in the position shown by being in contact with an annular abutment 54 one of which is fastened to the underside of support 4 around each of openings 25 as by means of bolt 55.

The outer ends of keys 51 and the lower wall of cam slot 52 are tapered so that upward movement of actuator 53 relatively to body 45 will cause keys 51 to be moved radially inward. If the nose 48 of broach 40 has previously been inserted into bore 47, the inner ends of keys 51 will enter cannelure 49 and cam slot 52 will move above the outer ends of keys 51 and cause keys 51 to positively lock broach 40 to puller 24. Also, the inner ends of keys 51, the end of nose 48 and the end walls of cannelure 49 are tapered so that, when actuator 53 is in the position shown, keys 51 may be moved radially outward in response to movement of nose 48 into or out of bore 47.

Actuator 53 is used upward by a spring 56 which reacts against a sleeve 57 threaded at its lower end upon shank 46. The upper end of sleeve 57 is slidably fitted upon the outer peripheral surface of actuator 53 and an annular guard 58 is pressed upon the upper end portion of actuator 53 and overlaps the upper end of sleeve 57 to keep chips out of the tool puller.

The arrangement is such that, with slides 6 and 17 in their uppermost positions, the tail 39 of broach 40 can be manually inserted into or removed from socket 23. With tail 39 inserted into socket 23, detent 36 will support the weight of the broach and then downward movement of slide 17 relatively to slide 6 will cause the nose 48 of broach 40 to enter bore 47.

When both slides move downward, actuator 53 will move away from abutment 54 and spring 56 will raise actuator 53 relatively to body 45 which will cause actuator 53 to advance keys 51 and positively lock broach 40 to puller 24. When slides 6 and 17 move away from each other, puller 24 will pull broach 40 out of socket 23.

Referring now to Fig. 9 liquid for energizing motor 7—8 is provided by a main pump P1 which may be of any suitable type but which has been indicated as being a reversible variable displacement pump of a type which is well known and in extensive commercial use. It is deemed sufficient to state that pump P1 has a control stem 60, two ports 61 and 62, that it is provided with a reservoir 63 containing a supply of liquid, that it is controlled by two solenoids S1 and S2 which are connected to control stem 60, that pump displacement is zero when both solenoids are deenergized, that solenoid S1 when energized will move control stem 60 outward which will cause pump P1 to discharge liquid through port 61 and be supplied with liquid through port 62, and that energizing solenoid S2 and deenergizing solenoid S1 will cause control stem 60 to be moved inward and pump P1 to discharge liquid through port 62 and be supplied with liquid through port 61.

Port 62 is connected to an external channel 64 and also to an internal channel 65 which extends into the liquid in reservoir 63 and has connected therein a check valve 66 which permits the pump to draw liquid from reservoir 63 but prevents the pump from discharging liquid through channel 65 into reservoir 63 except through a high pressure relief valve 67 which is connected in parallel with check valve 66.

Port 61 is connected to an external channel 68 and also to an internal channel 69 which extends into the liquid in reservoir 63 and has connected therein a check valve 70 which permits the pump to draw liquid from reservoir 63 but prevents the pump from discharging liquid through channel 69 into reservoir 63 except through a high pressure relief valve 71 which is connected in parallel with check valve 70.

Liquid for control purposes, such as operating the displacement varying mechanism of pump P1, is supplied by a gear pump 72 which has been shown as a separate pump but which in practice is driven in unison with pump P1 and is arranged within the casing thereof. Pump 72 draws liquid from reservoir 63 and discharges it into a channel 73 one branch of which extends to a point of use of the liquid, such as the displacement varying mechanism of pump P1, and another branch of channel 73 is connected through a low pressure relief valve 74 to a channel 75 which is connected through a low pressure relief valve 76 to reservoir 63 and is also connected to channel 69 through a check valve 77 which permits liquid to flow from channel 75 into channel 69 but prevents flow in the opposite direction. When the pumps are running, gear pump 72 will maintain in channel 75 a pressure equal to the resistance of relief valve 76 and it will maintain in channel 73 a pressure equal to the sum of the resistances of relief valves 74 and 76.

Channel 64 has one branch thereof connected to one port of a pilot controlled foot valve 80 which has its other port connected by a channel 81 to the lower end of cylinder 7. Foot valve 80 is of a type which is well known and in extensive commercial use. It is deemed sufficient to state that it includes a solenoid S3, that it is closed against any flow of liquid when solenoid S3 is deenergized, and that it will open at a low pressure when solenoid S3 is energized.

Channel 68 and the other branch of channel 64 are connected to opposite ends of a bore 82 which is formed in the casing 83 of a differential valve 84 and has formed in the wall thereof a center port 85 and two interconnected ports 86 and 87 which are arranged at opposite sides of port 85 and are connected to the upper end of cylinder 7 by a channel 88 having connected thereto a pressure switch PS1 which controls solenoid S3. Port 85 communicates through a low pressure relief valve 89 with a reservoir which has been designated by the reference numerals 63a but which in practice is reservoir 63. Bore 82 has fitted therein a valve member 90 which has a duct 91 extending axially into it from its left end and then extending radially outward into communication with port 85.

The arrangement is such that, when the displacement of pump P1 is zero, piston 8 is supported by liquid trapped in cylinder 7 by foot valve 80. When pump P1 discharges liquid through port 61, the liquid will flow through channel 68 to the right end of differential valve 84 and move valve member 90 to the position shown in Fig. 10. Then the liquid will flow through valve 84 and channel 88 and tend to move piston 8 downward but foot valve 80 will resist discharge of liquid from cylinder 7 and thereby cause pump pressure to rise and operate pressure switch PS1 which, as will presently be explained, will cause solenoid S3 to be energized so that foot valve 80 will open at a lower pressure.

Then the liquid entering the upper end of cylinder 7 will cause piston 8 to move slide 6 downward and to eject liquid from cylinder 7 through channel 81 and foot valve 80 into channel 64. The volume of liquid ejected from cylinder 7 into channel 64 is greater than the volume discharged by pump P1 due to the displacement of piston rod 9. Enough of the ejected liquid to supercharge pump P1 will flow through channel 64 to port 62 and the remainder of the ejected liquid will flow through channel 64, differential valve 84 via duct 91 and port 85 and relief valve 89 to exhaust.

When pump P1 discharges liquid through port 62, some of the liquid will flow through channel 64, move valve member 90 to the position shown in Fig. 9 and create enough pressure in channel 88 to operate pressure switch PS1 and thereby cause solenoid S3 to be energized and to adjust foot valve 80 so that it will open at a lower pressure. Then the liquid discharged by pump P1 will flow through channel 64, foot valve 80 and channel 81 to the lower end of cylinder 7 and cause piston 8 to move slide 6 upward and to eject liquid from cylinder 7 through channel 88 and differential valve 84 into channel 64 where it joins the liquid discharged by pump P1 and thereby causes piston 8 to move slide 6 upward at high speed.

During the time that pump P1 is discharging into channel 64, liquid discharged by gear pump 72 will flow through channel 73, relief valve 74, channel 75, check valve 77 and channel 69 into port 61. If the volume supplied by gear pump 72 is insufficient to keep pump P1 supplied with liquid, pump P1 will draw liquid from reservoir 63 through channel 69 and check valve 70.

Liquid for energizing tool handling motors 18—19 is supplied by an auxiliary pump P2 shown as being supplied with liquid from a reservoir 63b but it may be supplied from reservoir 63. Flow of liquid to and from motors 18—19 is controlled by a control valve 95 which includes a casing 96 having an axial bore 97 formed therein and a valve member 98 fitted in bore 97. Valve member 98 controls communication between an exhaust port 99, an inlet port 100 and two distributing ports 101 and 102 all of which are formed in the wall of bore 97.

Valve member 98 is urged to its central or neutral position as shown in Fig. 9 by two springs 103 and 104 and it is adapted to be shifted in one direction or the other in response to one or the other of two solenoids S4 and S5 being energized. In order to simplify the drawing, solenoids S4 and S5 have been shown connected directly to the stems of valve member 98 but in practice valve member 98 is shifted by liquid supplied thereto from gear pump 72 under the control of a pilot valve and the pilot valve is shifted by the solenoids.

Discharge port 99 of valve 95 is connected to exhaust by a channel 105 which has been shown as being connected to opposite ends of bore 97. Inlet port 100 is connected to the outlet of pump P2 by a channel 106 which is also connected to exhaust through a relief valve 107 and a choke 108 which have a pressure switch PS2 connected therebetween.

Distributing ports 101 and 102 are connected to opposite ends of motors 18—19 by channels having flexible or extensible portions such as flexible tubing or slide pipes. As shown, port 101 is connected by a channel 109 to the lower end of a slide pipe 110 the upper end of which is connected to the upper end of cylinders 18 by a branched channel 111 and port 102 is connected by a channel 112, a check valve 113 and a relief valve 114 which are connected in parallel with each other, a channel 115, a slide pipe 116 and a branched channel 117 to the lower ends of cylinders 18. Check valve 113 permits liquid to flow freely from valve 95 to the lower ends of cylinders 18 but prevents flow from the lower ends of cylinders 18 to valve 95 except through relief valve 114 which has sufficient resistance to prevent piston 19 and slide 17 from descending by gravity.

The arrangement is such that when both of solenoids S4 and S5 are deenergized, springs 103 and 104 will hold valve member 98 in its neutral position as shown in Fig. 9 and pump P2 will be bypassed through channel 106, valve 95 and channel 105. When solenoid S4 is energized, it will shift valve member 98 into the position shown in Fig. 11 and then the liquid discharged by pump P2 will flow through channel 106, valve 95, channel 109, slide pipe 110 and channel 111 to the upper ends of cylinders 18 and cause pistons 19 to move slide 17 downward and to eject liquid from cylinders 18 through channel 117, slide pipe 116, channel 115, relief valve 114, channel 112, valve 95 and channel 105 to exhaust.

When pistons 19 stall against the ends of cylinders 18, pump P2 will discharge through relief valve 107 and choke 108 to exhaust and the resistance of choke 108 will cause the pressure at its inlet to rise sufficiently to open pressure switch PS2 which will cause solenoid S4 to be deenergized and permit spring 104 to return valve member 98 to its initial position and thereby bypass pump P2 which will cause pump pressure to drop and permit pressure switch PS2 to close.

Figure 12:
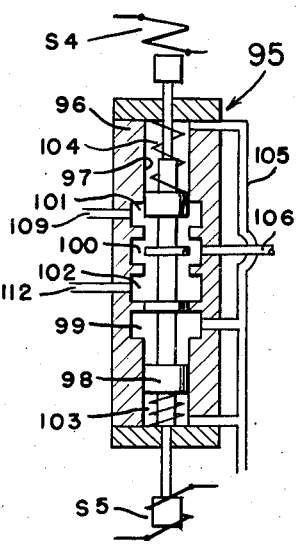

When solenoid S5 is energized, it will shift valve member 98 into the position shown in Fig. 12 and then the liquid discharged by pump P2 will flow through channel 106, valve 95, channel 112, check valve 113, channel 115, slide pipe 116 and channel 117 to the lower ends of cylinders 18 and cause pistons 19 to move slide 17 upward and to eject liquid from cylinders 18 through channel 111, slide pipe 110, channel 109 and valve 95 into channel 112 where it joins the liquid discharged by pump P2 so that slide 17 is moved upward by liquid acting upon an area of so much of each piston 19 equal only to the cross-sectional area of piston rod 20 at a higher speed than obtainable if merely the oil delivered by the pump P2 were employed.

When pistons 19 stall against the upper ends of cylinders 18, pump pressure will rise and cause pressure switch PS2 to open, solenoid S5 to be deenergized and valve member 98 to be returned to neutral and bypass pump P2 as explained above.

It has previously been explained that when slide 17 moves downward relatively to slide 6, a broach carried by a socket 23 will be inserted into a tool puller 24 and that, when slides 6 and 17 move downward together, puller 24 will fix the broach for movement with slide 6. Socket 23 will guide the trailing end of the broach and positively hold it in alinement with the leading end thereof but, if the broach is very slender, it is very desirable to maintain tension on the broach to prevent deflection of the intermediate portion thereof.

If tension is to be maintained upon the broach during the greater part of the broaching operation, socket 23 can not be used because it is so constructed that only a small force is required to remove the tail of a broach therefrom. Therefore, socket 23 must be replaced with a socket which will lock the tail of a broach therein such, for example, as the socket 23ª shown in Fig. 13. Also, in order to provide means for unlocking the socket, bracket 22 must be modified as indicated by the bracket 22ª shown in Fig. 14.

As shown, socket 23ª includes a casing 120 and a top plate 121 which are adapted to be fastened to bracket 22ª in any suitable manner. Casing 120 has a tubular bushing 122 extending therethrough to receive the tail 39 of the broach. The interior of bushing 122 communicates through an opening 123 with a chamber 124 which is formed in casing 120 adjacent to bushing 122 and has a locking lever 125 arranged therein and pivoted intermediate its ends upon a pin 126 carried by the side walls of chamber 124.

One end of lever 125 extends through opening 123 and is adapted to extend into the cannelure 38 in broach tail 39. That end of lever 125 is urged downward against the bottom wall of opening 123 by a plunger 127 which is fitted in a bore 128 formed in casing 120. Plunger 127 is urged downward by a spring 129 arranged within bore 128 between plunger 127 and top plate 121. The other end of lever 125 is engaged by one end of a trip lever 130 which is pivoted intermediate its ends upon a pin 131 carried by two lugs 132 which are formed upon casing 120 at opposite sides of chamber 124. The other end of lever 130 is bifurcated and has a roller 133 journaled therein upon a pin 134.

Roller 133 engages a flat cam track 135 formed upon a rod 136 which is slidable through the horizontal part of bracket 22ª and through a guide 137 which is fastened to bracket 22ª. Rod 136 has a head 138 formed upon its upper end and normally held in contact with bracket 22ª by a spring 139 arranged around rod 136 between guide 137 and a collar 140 fixed to rod 136. The lower end portion of rod 136 is bored and tapped and has a trip rod 141 threaded therein and held in adjusted position by a lock nut 142.

The arrangement is such that, when slides 6 and 17 are in their upper positions and the tail 39 of a broach is inserted into bushing 122, the tapered end of tail 39 will swing lever 125 upon pin 126 and permit tail 39 to be moved upward until cannelure 38 registers with opening 123. Then spring 129 and plunger 128 will swing the right end of lever 125 downward to lock the broach to socket 23ª.

After a broach has been locked in socket 23ª, downward movement of slide 17 to the end of its stroke will cause the nose of the broach to be inserted into a tool puller 24, a slight downward movement of slide 6 will cause the nose of the broach to be locked in puller 24, slides 6 and 17 will move downward together until slide 6 reaches a given point at which time the greater part of the broaching operation will have been completed, and then motors 18—19 will be energized and will move slide 17 upward relatively to slide 6 as previously explained.

Just before motors 18—19 are energized, downward movement of cam rod 136 is stopped by rod 141 engaging a suitable abutment such as work support 4. As slide 17 continues downward, roller 133 will ride up the inclined part 143 of cam track 135 and cause lever 130 to swing locking lever 125 out of cannelure 38, thereby releasing the broach so that motors 18—19 can move slide 17 upward relatively to slide 6.

During the time that opposite ends of the broach are engaged by socket 23ª and puller 24, tension may be maintained upon the broach by subjecting the lower faces of pistons 19 to a low pressure. This may be accomplished by connecting the lower ends of cylinders 18 to gear pump 72 such as by connecting gear pump supply channel 73 to channel 115 thru a check valve 144 and providing a shut-off valve 145 in channel 73 between check valve 144 and pump 72 as indicated in Fig. 9. Then by opening valve 145 slightly, gear pump pressure will extend into the lower ends of cylinders 18 but flow of gear pump liquid into cylinders 18 when pistons 19 are moving upward and when the lower ends of cylinders 18 are connected to exhaust is kept at a very low rate by valve 145. It is obvious that the rate at which gear pump liquid can flow to cylinders 18 could be limited by a choke inserted into channel 73 in which case valve 145 could be fully opened.

THE ELECTRIC CIRCUIT

Figure 15:
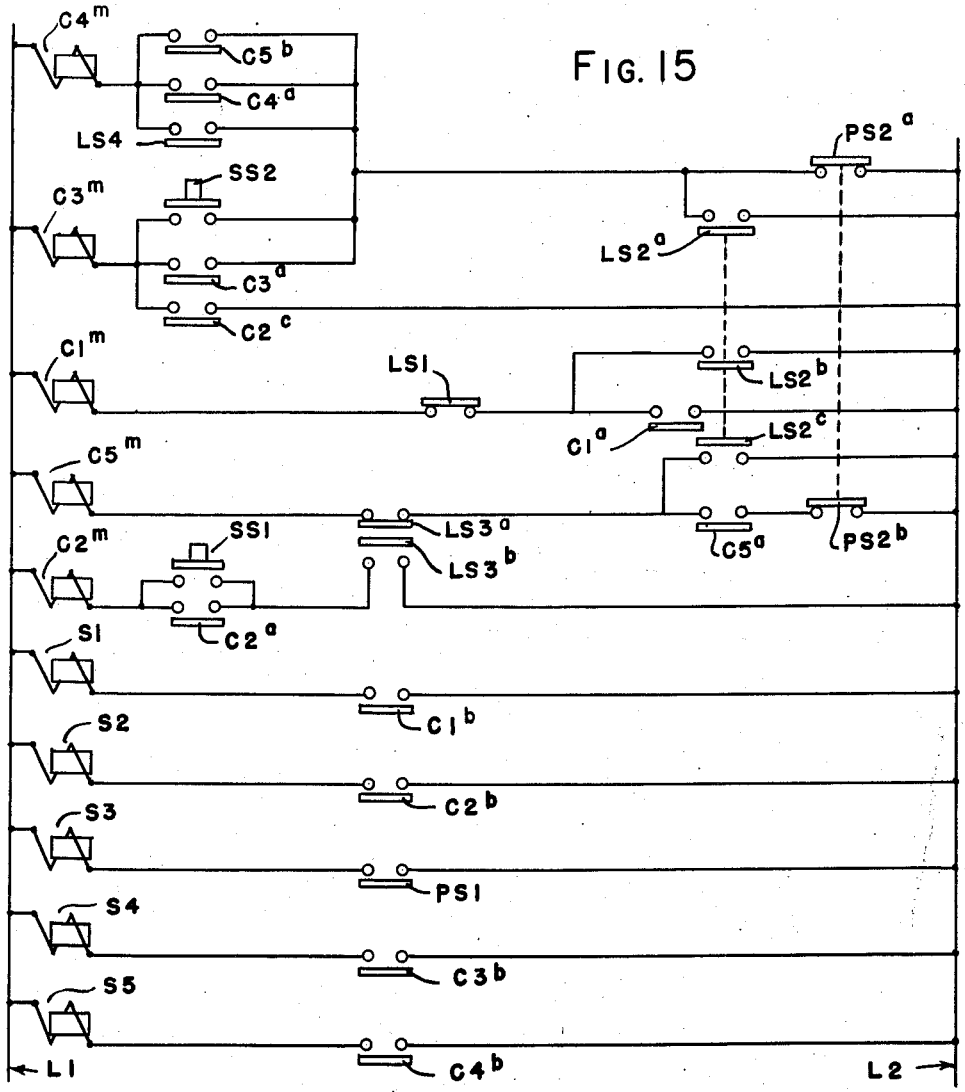
Fig. 15 is a diagram illustrating the principal parts of an electric circuit which may be employed to control the operation of the machine.

Electric current for energizing the several solenoids is supplied from power lines L1 and L2 as indicated in Fig. 15 which shows only so much of the electric circuit as is necessary to an understanding of the operation of the machine during a semi-automatic cycle but in practice the circuit includes suitable means for connecting lines L1 and L2 to a source of power, means for effecting movement of slides 6 and 17 upward or downward independently and selectively, means for effecting full automatic operation of the machine, suitable safety means such as one or more stop switches and additional starting switches which require that the operator use both hands to start the machine, and a selector switch for selecting between manual control, automatic operation and semi-automatic operation of the machine.

Figure 16:
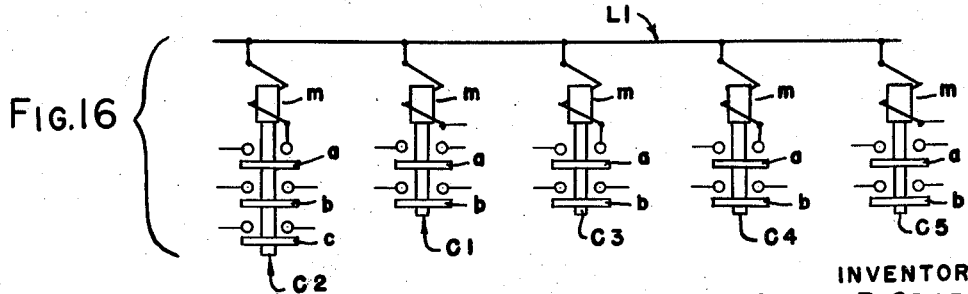
Fig. 16 is a diagram illustrating the relations of certain switches shown in Fig. 15.

Solenoids S1 and S2 are controlled, respectively, by two magnetic switches or contactors C1 and C2. As indicated in Fig. 16, contactor C1 includes a magnet $m$ and two switches $a$ and $b$ while contactor C2 includes a magnet $m$ and three switches $a$, $b$ and $c$. As indicated in Fig. 15, solenoid S1 has one end of its winding connected directly to line L1 and the other end of its winding connected to line L2 through switch C1$^b$, solenoid S2 has one end of its winding connected directly to line L1 and the other end of its winding connected to line L2 through switch C2$^b$, and solenoid S3 has one end of its winding connected directly to line L1 and the other end of its winding connected to line L2 through pressure switch PS1.

Solenoids S4 and S5 are controlled, respectively, by two magnetic switches or contactors C3 and C4 each of which includes a magnet $m$ and two switches $a$ and $b$ as indicated in Fig. 16. Solenoid S4 has one end of its winding connected directly to line L1 and the other end of its winding connected to line L2 through switch C3$^b$ while solenoid S5 has one end of its winding connected directly to line L1 and the other end of its winding connected to line L2 through switch C4$^b$ as indicated in Fig. 15.

Contactor C1 is controlled in part by a limit switch LS1 and in part by a limit switch LS2. As indicated in Fig. 9, limit switch LS1 is a single normally closed switch which is adapted to be operated at the end of the down stroke of slide 6 by an actuator 150 carried by slide 6 while limit switch LS2 is a multiple switch having three normally open contacts or individual switches $a$, $b$ and $c$ which are adapted to be closed by an actuator 151 carried by slide 17. As indicated in Fig. 15, magnet C1$^m$ of contactor C1 has one end of its winding connected directly to line L1 and the other end of its winding connected to one terminal of switch LS1 the other terminal of which is connected to one terminal of switch C1$^a$ and to one terminal of switch LS2$^b$. The other terminals of switches C1$^a$ and LS2$^b$ are connected to line L2.

Contactor C2 is controlled in part by a manually operable starting switch SS1 and in part by a double acting limit switch LS3. As indicated in Fig. 9, limit switch LS3 has two contacts or individual switches *a* and *b* and is spring biased to a position in which its switch *a* is open and its switch *b* is closed but, when slide 6 moves to its upper limit, an actuator 152 carried by slide 6 closes switch *a* and opens switch *b*. As indicated in Fig. 15, magnet C2$^m$ has one end of its winding connected directly to line L1 and the other end of its winding connected to one terminal of each of switches SS1 and C2$^a$ the other terminals of which are connected to one terminal of switch LS3$^b$ which has its other terminal connected to line L2.

Contactor C3 is controlled in part by each of a manually operable starting switch SS2, contactor C2, limit switch LS2 and pressure switch PS2 which as indicated in Fig. 9 includes two normally closed individual switches *a* and *b*. As indicated in Fig. 15, magnet C3$^m$ has one end of its winding connected directly to line L1 and the other end of its winding connected to one terminal of each of switches SS2, C3$^a$ and C2$^c$. The other terminal of switch C2$^c$ is connected directly to line L2. The other terminals of switches SS2 and C3$^a$ are both connected to one terminal of each of switches LS2$^a$ and PS2$^a$ the other terminals of which are connected to line L2.

Contactor C4 is controlled in part by each of pressure switch PS2, limit switch LS2, a limit switch LS4 and a contactor C5 which as indicated in Fig. 16 includes a magnet *m* and two switches *a* and *b*. As indicated in Fig. 9, limit switch LS4 is adapted to be closed momentarily at a given point in the down stroke of slide 6 by an actuator 153 carried by slide 6. It is not closed during the up stroke of slide 6.

As indicated in Fig. 15, magnet C4$^m$ has one end of its winding connected directly to line L1 and the other end of its winding connected to one terminal of each of switches C5$^b$, C4$^a$ and LS4 the other terminals of which are connected to one terminal of each of switches LS2$^a$ and PS2$^a$ which have their other terminals connected to line L2.

Contactor C5 is controlled in part by limit switches LS2 and LS3 and in part by pressure switch PS2. As indicated in Fig. 15, magnet C5$^m$ has one end of its winding connected directly to line L1 and the other end of its winding connected to one terminal of switch LS3$^a$ the other terminal of which is connected to one terminal of each of switches C5$^a$ and LS2$^c$. The other terminal of switch LS2$^c$ is connected to line L2. The other terminal of switch C5$^a$ is connected to one terminal of switch PS2$^b$ the other terminal of which is connected to line L2.

*Operation*

Referring now primarily to Figs. 9 and 15 and assuming that work to be broached is arranged upon support 4 and that a broaching tool is supported at its upper end in each of sockets 23, the machine will operate as follows:

With the parts in the positions shown and with pumps P1 and P2 running, pump P1 will be at zero displacement so that no liquid is delivered thereby, pump P2 will be bypassed through valve 95, actuator 152 will be holding switch LS3$^a$ closed and switch LS3$^b$ open, slide 6 will be supported by liquid trapped in cylinder 7 by foot valve 80 and slide 17 will be supported by liquid trapped in cylinders 18 by relief valve 114.

When starting switch SS2 is closed, it will establish a circuit (L1–C3$^m$–SS2–PS2$^a$–L2) to energize magnet C3$^m$ and cause contactor C3 to close its switches *a* and *b*. Closing switch C3$^a$ will establish a holding circuit to keep magnet C3$^m$ energized when starting switch SS2 is released. Closing switch C3$^b$ will establish a circuit to energize solenoid S4 which will shift valve member 98 to the position shown in Fig. 11 and then the liquid discharged by pump P2 will flow to the upper ends of cylinders 18 and cause pistons 19 to move slide 17 downward as previously explained.

As slide 17 moves downward, the lower ends of the broaches carried by sockets 23 will pass through the work and into tool pullers 24. Just before slide 17 reaches the end of its down stroke relatively to slide 6, actuator 151 will operate limit switch LS2 to close its switches *a* and *b*. Closing switch LS2$^a$ will establish a holding circuit around switch PS2$^a$. Closing switch LS2$^b$ will establish a circuit (L1–C1$^m$–LS1–LS2$^b$–L2) to energize magnet C1$^m$. Just after actuator 151 operates limit switch LS2, pistons 19 will stall against the lower ends of cylinders 18 which will cause the pressure created by pump P2 to rise sufficiently to open relief valve 107 and cause pressure switch PS2 to open but the circuit through magnet C3$^m$ is maintained by limit switch LS2$^a$.

Energizing magnet C1$^m$ will cause contactor C1 to close its switches *a* and *b*. Closing switch C1$^a$ will establish a circuit to keep magnet C1$^m$ energized when switch LS2$^b$ opens. Closing switch C1$^b$ will establish a circuit to energize solenoid S1 and thereby cause pump P1 to discharge liquid which will flow through channel 68, move plunger 90 of differential valve 84 to the position shown in Fig. 10 and then create in channel 88 a pressure which will cause pressure switch PS1 to close and establish a circuit to energize solenoid S3 which will cause foot valve 80 to open at a low pressure and then liquid will flow to the upper end of cylinder 7 and cause piston 8 to move slide 6 downward as previously explained.

As soon as slide 6 starts downward, actuator 152 will release limit switch LS3 which will open its switch *a* and close switch *b* to condition the circuit for subsequent operation. As slide 6 moves downward, tool pullers 24 will move out of contact with abutment 54 which will permit pullers 24 to lock the broaches to slide 6. Just after the broaches have been locked in pullers 24, actuator 151 will move below limit switch LS2 and permit switches LS2$^a$ and LS2$^b$ to open. Opening switch LS2$^b$ has no effect because the circuit through magnet C1$^m$ is maintained by switch C1$^a$. Opening switch LS2$^a$ will break the circuit through magnet C3$^m$ and permit contactor C3 to open its switches and deenergize solenoid S4 which will permit valve member 98 to return to neutral and bypass pump P2. Bypassing pump P2 will cause the pressure created thereby to drop to zero and permit pressure switch PS2 to close which will have no effect at that time.

As slide 6 continues downward, it will pull the broaches through the work and the upper ends of the broaches will be guided by socket 23 during the greater part of the broaching operation. At a given point in the down stroke of broach 6 such as when sockets 23 have approached to a point close to the work, actuator 153 will close limit switch LS4 momentarily to establish a circuit (L1–LS4–PS2$^a$–L2) to energize magnet C4$^m$ which will cause contactor C4 to close its switches *a* and *b*.

Closing switch C4$^a$ will establish a circuit to keep magnet C4$^m$ energized when limit switch LS4 opens. Closing switch C4$^b$ will establish a circuit to energize solenoid S5 which will shift valve member 98 into the position shown in Fig. 12 and then the liquid discharged by pump P1 will flow to the lower ends of cylinders 18 and cause pistons 19 to move slide 17 to its upper position relative to slide 6 as previously explained. Switch LS4 will open as soon as actuator 153 has moved below it but the circuit through magnet C4$^m$ will be maintained by a switch C4$^a$ until pistons 19 stall against the upper ends of cylinders 18 which will cause the pressure created by pump P2 to rise and open pressure switch PS2.

Opening switch PS2$^a$ will break the circuit through magnet C4$^m$ and permit contactor C4 to open and deenergize solenoid S5 which will permit valve member 98 to be returned to its neutral position and bypass pump P2, thereby causing pump pressure to drop and permit pressure switch PS2 to close.

Slide 6 will continue downward until actuator 150 opens limit switch LS1 to break the circuit through magnet C1$^m$ and permit contactor C1 to open and deenergize solenoid S1 which will cause the displacement of pump P1 to be reduced to zero, thereby deenergizing motor 7–8. Reducing the displacement of pump P1 to zero will cause pump pressure in channel 88 to drop and permit pressure switch PS1 to open and deenergize solenoid S3 which will cause foot valve 80 to close and prevent further downward movement of slide 6.

After the work has been removed from support 4, an up stroke of slide 6 may be initiated by closing starting switch SS1 to establish a circuit (L1–C2$^m$–SS1–LS3$^b$–L2) to energize magnet C2$^m$ which will cause contactor C2 to close its switches $a$, $b$ and $c$. Closing switch C2$^a$ will establish holding circuit to keep magnet C2$^m$ energized when starting switch SS1 is released. Closing switch C2$^b$ will establish a circuit to energize solenoid S2. Closing switch C2$^c$ will establish a circuit (L1–C3$^m$–C2$^c$–L2) to energize magnet C3$^m$ which will cause contactor C3 to close its switches $a$ and $b$. Closing switch C3$^b$ will establish a circuit to energize solenoid S4. Closing switch C3$^a$ will have no effect at this time.

Energizing solenoid S2 will cause pump P1 to discharge liquid into channel 64 and the liquid will move differential valve plunger 90 to the position shown in Fig. 9 but it cannot enter either end of cylinder 7 because foot valve 80 is closed. Therefore, pump pressure will rise and close pressure switch PS1 to cause solenoid S3 to be energized and to condition foot valve 80 so that it will open at a low pressure as previously explained. The liquid discharged by pump P1 will then flow through channel 64, foot valve 80 and channel 81 to the lower end of cylinder 7 and cause piston 8 to move slide 6 upward and to eject liquid from the upper end of cylinder 7 through channel 88, differential valve 84, channel 64, foot valve 80 and channel 81 to the lower end of cylinder 7 so that slide 6 is moved upward at high speed. As slide 6 starts upward, actuator 150 will permit limit switch LS1 to close but no circuit will be established because switch C1$^a$ is open.

Figure 11:
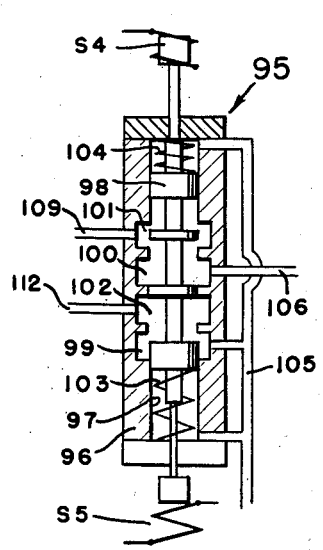
Figs. 11 and 12 are views showing a directional control valve member in positions different from that shown in Fig. 9.
Figure 5:
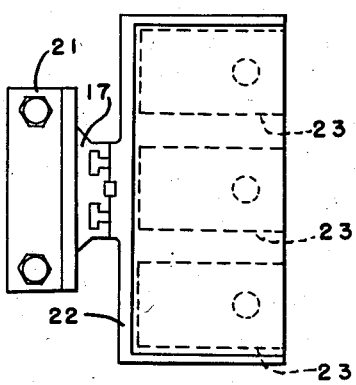
Fig. 5 is a top plan view of the tool handling slide as indicated by the line 5—5 of Fig. 4.

Energizing solenoid S4 will cause it to shift valve member 98 to the position shown in Fig. 11 and thereby cause pistons 19 to move slide 17 downward relatively to slide 6 as previously explained.

Slides 6 and 17 are started moving simultaneously but slide 6 moves at such a high speed that it will have moved the upper ends of the broaches well above support 4 before slide 17 completes its stroke. As slide 17 approaches the end of its down stroke relatively to slide 6, sockets 23 will engage the upper ends of the broaches and immediately thereafter pistons 19 will stall against the lower ends of cylinders 18 and then the pressure created by pump P2 will rise and cause pressure switch PS2 to open which will cause contactor C3 to open, solenoid S4 to be deenergized and valve member 98 to return to neutral to bypass pump P2 as previously explained.

After slide 17 has completed its stroke, slides 6 and 17 will move upward as a unit. As slide 6 approaches its upper limit, actuator 151 will cause limit switch LS2 to close its switch LS2$^c$ and immediately thereafter actuator 152 will cause limit switch LS3 to break the circuit through magnet C2$^m$ and to establish a circuit (L1–C5$^m$–LS3$^a$–LS2$^c$–L2) to energize magnet C5$^m$.

Breaking the circuit through magnet C2$^m$ will cause contactor C2 to open switches $a$, $b$ and $c$. Opening switches C2$^a$ and C2$^c$ will have no effect at this time. Opening switch C2$^b$ will deenergize solenoid S2 which will cause the displacement of pump P1 to be reduced to zero with a resultant drop in pressure which will cause pressure switch PS1 to open and deenergize solenoid S3 which will cause foot valve 80 to close and support piston 8 in its upper position.

Energizing magnet C5$^m$ will cause contactor C5 to close its switches $a$ and $b$. Closing switch C5$^a$ will keep magnet C5$^m$ energized when switch LS2$^c$ opens. Closing switch C5$^b$ will establish a circuit (L1–C4$^m$–C5$^b$–PS2$^a$–L2) to energize magnet C4$^m$ and cause contactor C4 to close its switches $a$ and $b$. Closing switch C4$^a$ will have no effect at this time. Closing switch C4$^b$ will establish a circuit to energize solenoid S5 which will cause valve member 98 to shift to the position shown in Fig. 12 and pistons 19 to move slide 17 upward relatively to slide 6 as previously explained. After slide 17 moved a short distance upward relatively to slide 6, actuator 151 will disengage limit switch LS2 which will open its switch LS2$^c$ but the circuit through magnet C5$^m$ will be maintained by switch C5$^a$.

Slide 17 will continue upward until pistons 19 stall against the upper ends of cylinders 18 which will cause the pressure created by pump P2 to rise and open pressure switch PS2 which will deenergize magnets C4$^m$ and C5$^m$ and permit contactors C4 and C5 to open their switches $a$ and $b$. Opening switches C4$^a$, C5$^a$ and C5$^b$ will prevent magnets C4$^m$ and C5$^m$ from being re-energized when pressure switch PS2 closes. Opening switch C4$^b$ will deenergize solenoid S5 which will permit valve member 98 to return to neutral and bypass pump P2, thereby causing pump pressure to drop and pressure switch PS2 to close as previously explained.

The parts will then be in their original positions and a second cycle of operations may be initiated by closing starting switch SS2.

The broaching machine disclosed herein may be modified in various ways without departing from the scope of the invention which is hereby claimed as follows:

1. In a broaching machine for reciprocating a broach through work, a frame, a main slide mounted for sliding movement on said frame, a tool handling sub-slide mounted for sliding movement on said main slide, means mounted on said main slide for gripping one end of a broach, means mounted on said sub-slide for gripping the other end of a broach, power means mounted on said frame and connected to said main slide for reciprocating the same and said sub-slide as a unit in a broaching operation, power means mounted on said main slide and connected to said sub-slide for creating a tension on said broach during broaching and for moving said sub-slide relative to said main slide a sufficient distance to facilitate placement and removal of said broach through said work.

2. In a broaching machine for reciprocating a broach through work, a frame, a main slide mounted for sliding movement on said frame, a tool handling sub-slide mounted for sliding movement on said main slide, means mounted on said main slide for gripping one end of a broach, means mounted on said sub-slide for gripping the other end of a broach, power means mounted on said frame and connected to said main slide for reciprocating the same and said sub-slide as a unit in a broaching operation, a fluid motor mounted on said main slide and connected to said sub-slide for moving said sub-slide relative to said main slide a sufficient distance to facilitate placement and removal of said broach through said work.

References Cited in the file of this patent

UNITED STATES PATENTS

| | | |
|---|---|---|
| 1,937,121 | Lapointe | Nov. 28, 1933 |
| 2,135,157 | West | Nov. 1, 1938 |
| 2,135,861 | Thompson | Nov. 8, 1938 |
| 2,253,303 | Lapointe | Aug. 19, 1941 |
| 2,315,476 | Groene | Mar. 30, 1943 |
| 2,343,420 | Podesta | Mar. 7, 1944 |
| 2,372,823 | Gotberg | Apr. 3, 1945 |

FOREIGN PATENTS

| | | |
|---|---|---|
| 440,852 | Great Britain | Jan. 7, 1936 |